United States Patent
Nicholas et al.

(10) Patent No.: US 11,857,990 B2
(45) Date of Patent: Jan. 2, 2024

(54) SYSTEMS AND METHODS FOR COLD SPRAY ADDITIVE MANUFACTURING AND REPAIR WITH GAS RECOVERY

(71) Applicant: The Boeing Company, Chicago, IL (US)

(72) Inventors: Michael Nicholas, Mesa, AZ (US); Bruno Zamorano Senderos, Huntsville, AL (US); Kenneth Young, Seattle, WA (US)

(73) Assignee: The Boeing Company, Chicago, IL (US)

( * ) Notice: Subject to any disclaimer, the term of this patent is extended or adjusted under 35 U.S.C. 154(b) by 588 days.

(21) Appl. No.: 16/557,892

(22) Filed: Aug. 30, 2019

(65) Prior Publication Data
US 2020/0407855 A1    Dec. 31, 2020

Related U.S. Application Data

(60) Provisional application No. 62/867,221, filed on Jun. 26, 2019.

(51) Int. Cl.
*C23C 24/04*    (2006.01)
*B05B 14/30*    (2018.01)
(Continued)

(52) U.S. Cl.
CPC ............. *B05B 14/30* (2018.02); *B22F 10/25* (2021.01); *B22F 10/77* (2021.01); *B22F 12/10* (2021.01);
(Continued)

(58) Field of Classification Search
None
See application file for complete search history.

(56) References Cited

U.S. PATENT DOCUMENTS 5,302,414 A  *  4/1994  Alkhimov .............. B05B 7/1486
427/195
5,795,626 A  *  8/1998  Gabel ....................... B24C 5/02
15/345
(Continued)

FOREIGN PATENT DOCUMENTS

EP    1383610 A1    1/2004
EP    2206803 A1    7/2010
(Continued)

OTHER PUBLICATIONS

"Extended European Search Report Issued in European Patent Application No. 20171967.1-1010", dated Oct. 12, 2020, 9 Pages.
(Continued)

*Primary Examiner* — Michael P. Rodriguez
(74) *Attorney, Agent, or Firm* — Jordan IP Law, LLC

(57) ABSTRACT

Implementations provide cold spray additive manufacturing ("CSAM") with gas recovery in situ in an open environment without requiring part disassembly and removal to a repair facility. Recapturing and reusing gas in an open environment reduces costs, rendering CSAM more commercially viable and efficient, and avoids risk of new damage to parts from contemporary pre-existing CSAM processes. A gas recovery nozzle attaches to a supersonic nozzle and sends used gas to a gas recovery sub-system by capturing gas that is deflected on impact with the part during CSAM. Captured gas is stored for reuse. A flexible coupling controls distance from the gas recovery nozzle to a part substrate to prevent (1) nozzle clogging; (2) stationary shock wave interference with gas flow; and (3) gas flow misdirection. The gas recovery nozzle also suppresses disruptive supersonic sounds. Implementations enable capture for later reuse of supersonically-propelled gas during in-situ CSAM in open environments.

15 Claims, 8 Drawing Sheets

(51) Int. Cl.
  B33Y 10/00 (2015.01)
  B33Y 30/00 (2015.01)
  B22F 10/25 (2021.01)
  B22F 10/77 (2021.01)
  B22F 12/10 (2021.01)
  B22F 12/00 (2021.01)
  B22F 12/70 (2021.01)
  B22F 12/53 (2021.01)
  B22F 10/322 (2021.01)

(52) U.S. Cl.
  CPC .............. B22F 12/22 (2021.01); B22F 12/70 (2021.01); B33Y 10/00 (2014.12); B33Y 30/00 (2014.12); C23C 24/04 (2013.01); B22F 10/322 (2021.01); B22F 12/53 (2021.01)

(56) References Cited

U.S. PATENT DOCUMENTS

2006/0081174 A1* 4/2006 Baran ................ B05B 14/10
  118/326
2011/0052824 A1* 3/2011 Venkatachalapathy ...................
  B05B 7/1486
  118/323
2017/0341018 A1* 11/2017 She ....................... B01D 53/30
2019/0235477 A1* 8/2019 Widener ............ G05B 19/4155

FOREIGN PATENT DOCUMENTS

| | | |
|---|---|---|
| JP | 2009000632 A * | 1/2009 |
| JP | 5501803 B2 | 5/2014 |
| WO | 2017223236 A1 | 12/2017 |

OTHER PUBLICATIONS

European Communication for Application No. 20171967.1, dated Nov. 4, 2022, 6 pages.

* cited by examiner

SYSTEMS AND METHODS FOR COLD SPRAY ADDITIVE MANUFACTURING AND REPAIR WITH GAS RECOVERY

CROSS-REFERENCE TO RELATED APPLICATION

This application claims priority to and the benefit of U.S. Provisional Patent Application Ser. No. 62/867,221, filed on Jun. 26, 2019 and entitled "SYSTEMS AND METHODS FOR COLD SPRAY ADDITIVE MANUFACTURING AND REPAIR WITH GAS RECOVERY", which is incorporated by reference herein in its entirety.

BACKGROUND

Commercially viable and efficient cold spray additive manufacturing ("CSAM") to repair vehicles and other items requires the use of a supersonically propelled gas. For certain commercial applications, Helium is particularly effective. Helium supply is finite; Helium is an expensive resource that has been increasing in cost over time. As a result of the increasing acquisition cost of Helium, commercially viable and efficient CSAM deployment becomes increasingly less viable. Without the ability to reuse Helium from one CSAM repair session to the next, the acquisition cost of fresh Helium typically represents the bulk of total repair costs.

Without remediation, when spraying without a gas recovery booth gas used in CSAM is lost after a single use. Further, in some cases, the gas flies close to the substrate of the part that is subject to CSAM and is thus even more difficult to recover. Thus, in contemporary pre-existing cold spray implementations, cold spraying in an open environment (e.g., an airplane repair hangar) is completely non-viable, being too complex and expensive. And, no open environment cold spray gas recovery system exists.

Currently available CSAM-based part repair solutions use cold spray in a booth incorporating a gas recovery system to recapture the used gas for purification and reuse. This limits the applicability of cold spray to disassembled components that fit within the booth. Booth-based solutions have limited technological impact and restricted commercial application. Damaged parts must be disassembled, shipped to a repair facility, repaired in a booth, shipped back to the point of origin, and reassembled. The booth-based process is inefficient, expensive, and introduces multiple vectors for new damage to parts, requiring further costly repair or replacement. Current supersonic CSAM is also loud, causing disruption and often requiring hearing protection when in operation.

SUMMARY

Some implementations provide a gas recovery nozzle. The gas recovery nozzle includes a main body configured to attach to a supersonic nozzle. A first end has angled walls at an opening defining a gas flow path from the supersonic nozzle. A passage extends from the first end to a second end, the first end being a distal end and the second end being a proximal end relative to the supersonic nozzle. A cavity surrounds the passage and is configured to collect at least some gas expelled from the supersonic nozzle. The cavity defines a gas recovery path. An outlet within the main body is configured to connect to a gas recovery sub-system.

Other implementations provide a method for performing cold spray additive manufacturing. The method includes propelling particles to a substrate through a nozzle at a supersonic speed using a gas to perform cold spray additive manufacturing of a part, capturing a flow of the gas propelled from an end of the nozzle, and circulating the flow of the gas to a gas recovery system.

Still other implementations provide a system for performing cold spray additive manufacturing with gas recovery. The system includes a robotic control system configured to control a cold spray apparatus. The cold spray apparatus has a supersonic nozzle and is configured to perform cold spray additive manufacturing of a part. The system further includes a gas recovery nozzle comprising: a main body configured to attach to the supersonic nozzle, a first end having angled walls at an opening defining a gas flow path from the supersonic nozzle; a passage extending from the first end to a second end, the first end being a distal end and the second end being a proximal end relative to the supersonic nozzle, a cavity surrounding the passage and configured to collect at least some gas expelled from the supersonic nozzle and defining a gas recovery path, and an outlet within the main body configured to connect to a gas recovery sub-system. The gas recovery sub-system is configured to connect to the outlet and also configured to collect at least some gas expelled from the supersonic nozzle through the gas recovery path into a storage device. At least some gas collected into the storage device is stored for treatment and reuse in the cold spray apparatus.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the present disclosure will become better understood when the following detailed description is read with reference to the accompanying drawings, wherein.

Corresponding reference characters indicate corresponding parts throughout the drawings in accordance with an implementation.

DETAILED DESCRIPTION

Figure 1:
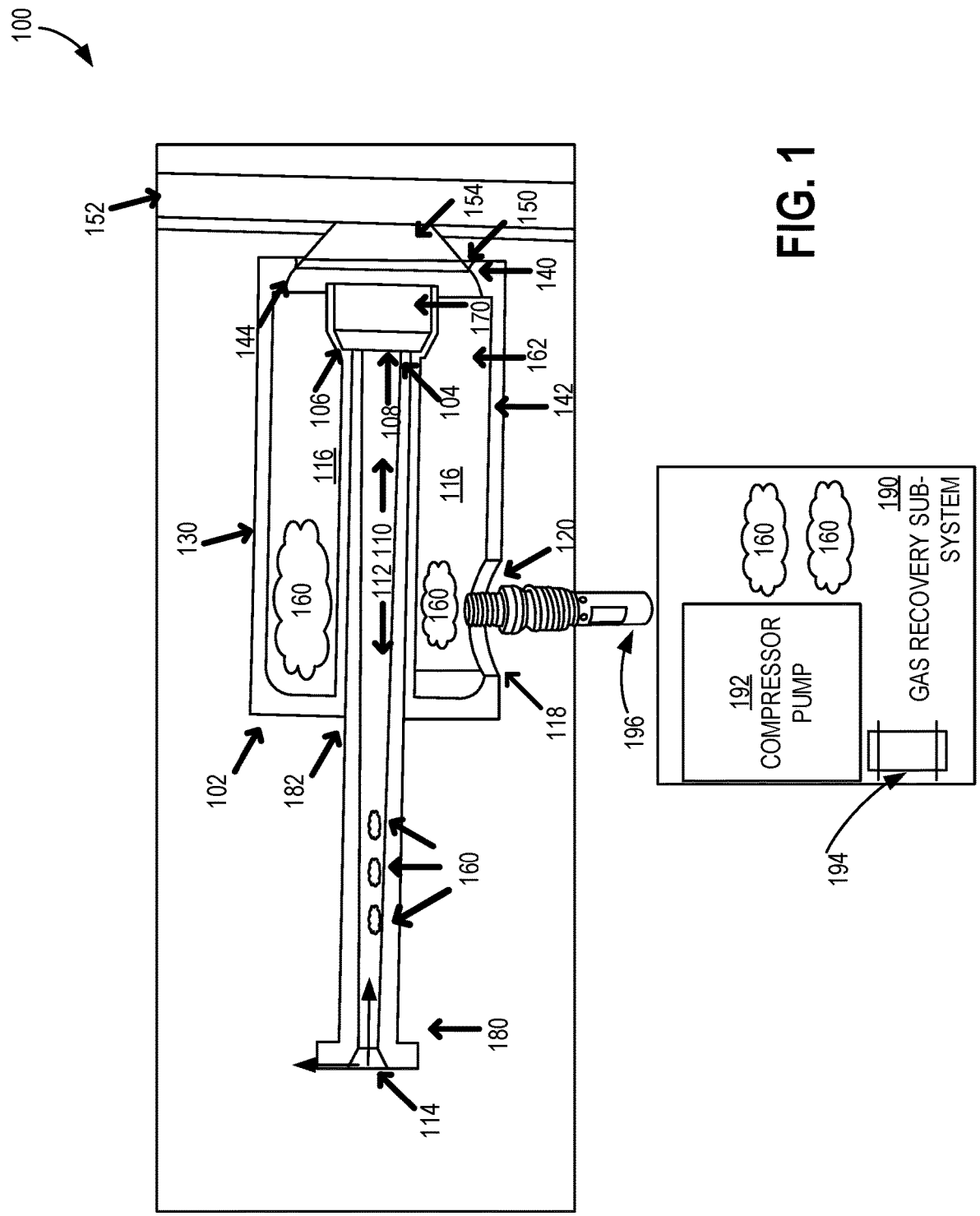
FIG. 1 is a cross-sectional side elevation illustration of an implementation of a gas recovery nozzle in accordance with an implementation.

Cold spray additive manufacturing (also "cold spray" or "CSAM" herein) is a material-deposition process where metal or metal-ceramic mixtures of powders (also referred to as "particles" herein) suspended in a gas propelled at supersonic speed are used to form a coating or freestanding structure. Specifically, cold spraying is defined herein as spraying a material at a temperature that is below the melting point of the material being sprayed. CSAM is a solid state process: neither the powders nor the substrate to which the powders are applied are melted during the process. Thus, use of CSAM provides material-deposition that does not cause thermally induced alterations to the substrate or powder (e.g., deformation, crystallization, imperfections, or other types of damage). Due to the direct impingement of the gases carrying the powders upon the substrate, cold spray generates a stationary shock wave and also a lateral flow of gas along the surface of the part subject to CSAM.

As used herein, a stationary shock wave in the context of the flow of supersonic gas (also called a "stationary normal shock wave") is a discontinuity that forms in order for the flow to meet some downstream condition (e.g., an obstacle or back pressure). When the back pressure becomes too great, the flow of gas cannot achieve supersonic speeds and is compressed at the nozzle before expanding. The presence of stationary shock waves thus detracts from optimal supersonic gas flow in CSAM systems and methods. Implementations of the disclosure also mitigate such stationary shock waves.

High- and low-pressure cold spray is an emerging technology finding increasing applications in various types of structural repairs. In some implementations, cold spray is usable to repair metallic structures (e.g., airplane or helicopter components). A closer examination of an implantation of a CSAM apparatus and process is provided in the discussion of FIG. 5 herein.

Referring to the figures, implementations of the disclosure include systems and methods for cold spray additive manufacturing with gas recovery that provide a superior cost/benefit ratio in comparison to conventional cold spray implementations. Recapturing and reusing the gas enables potentially large cost savings and renders cold spray additive manufacturing far more commercially viable and efficient. The various implementations not only allow for the reuse of the gas, but also enable cold spray additive manufacturing to occur in situ in an open environment (e.g., repairs on an airplane in an airplane hangar). Because no cold spray booth is required, the implementations completely avoid the need for disassembly, shipping a damaged part to a repair facility, conducting repairs in a booth fitted with a gas recovery system, shipping back to the point of origin, and reassembly. Comparatively, conducting cold spray additive manufacturing-based repairs in situ in an open environment is efficient, far less expensive, and avoids entirely multiple vectors for new damage to parts involved in contemporary pre-existing cold spray processes as well as the associated follow-up costly repairs or replacements.

The elements described herein in various implementations operate in an unconventional manner to provide systems and methods for cold spray additive manufacturing with gas recovery by utilizing a gas recovery nozzle. Implementations of the gas recovery nozzle are configured to attach to a supersonic nozzle used to conduct cold spray additive manufacturing. The gas recovery nozzle captures a lateral flow of gas from a part under repair and circulates the gas to a gas recovery sub-system. The gas recovery nozzle accomplishes this by creating an envelope over the supersonic nozzle that captures at least some of the gas that is deflected laterally on impact with the part under repair during cold spray additive manufacturing. The captured gas is circulated to the gas recovery sub-system. The gas recovery sub-system collects the captured gas into storage devices for later treatment (e.g., purification) and reuse in future cold spray additive manufacturing processes.

Some implementations of the gas recovery nozzle further comprise a flexible coupling to control the standout distance from the gas recovery nozzle to the substrate of the part. Maintaining an efficient standout distance between the gas recovery nozzle and the substrate of the part: (1) prevents additive particles from clogging either the supersonic nozzle or the gas recovery nozzle, allowing for a higher sustained rate of gas recovery per unit time; (2) prevents a stationary shock wave of the gas recovery nozzle from interfering with a supersonic flow of gas; (3) focuses or redirects the supersonic flow of gas in a useful and beneficial way; and (4) provides an adequate sealing that increases the gas capture rate. Effects of various standout distances on various implementations of the disclosure are discussed elsewhere herein. Further, the gas recovery nozzle acts as a suppressor for the supersonic nozzle, significantly reducing the very high decibel noise, and the associated disruption (e.g., from hearing damage or an inability to hear shouted warnings in a work area), typical of cold spray additive manufacturing solutions. In some implementations, the flexible coupling is a single component; in other implementations the flexible coupling is a mechanism with more than one component. Multi-part flexible couplings include but are not limited to flexible couplings assembled using petal joins.

The implementations of the present disclosure are thus superior to typical implementations of cold spray additive manufacturing systems and methods that fail completely to capture and reuse gas when repairs are conducted in situ without disassembly and use of a repair booth. The performance of implementations of the systems and methods for cold spray additive manufacturing with gas recovery disclosed herein, as measured by the ability to capture and reuse supersonically-propelled gas propelling particles onto a substrate, substantially equals and sometimes exceeds conventional existing contemporary systems and methods for cold spray additive manufacturing with gas recovery having designs that introduce inherent and unavoidable loss of supersonically-propelled gas.

The disclosure is thus mechanically more robust and more cost effective to implement, while at the same time being more effective than conventional systems and methods for cold spray additive manufacturing at both enabling reuse of supersonically-propelled gas and in-situ repairs.

Referring again to FIG. 1, a cross-sectional side elevation view illustrates an implementation of a gas recovery nozzle 100 in accordance with an implementation. The gas recovery nozzle 100 comprises a main body 102 configured to attach to a supersonic nozzle 180 and a first end 104 having angled walls 106 at an opening 108 defining a gas flow path 110 from the supersonic nozzle 180. In some implementations, a larger diameter opening is thereby defined at the distal end by an angled wall portion between laterally or longitudinally (e.g., straight) extending wall portions extending outward from a distal end of the supersonic nozzle. The first end 104 can take different shapes and configurations, such as having curved or arcuate walls that are continuously or gradually increasing or decreasing in curvature. That is, the present disclosure contemplates different conical shaped ends, or ends having different angled openings.

It should be noted that the first end 104 is illustrated as being located within the main body 102. However, the first end 104 in some implementations extends to the end of the main body 102. In various implementations the first end 104 is co-axial with the main body 102.

The gas recovery nozzle 100 further comprises a passage 112 extending from the first end 104 to a second end 114. The first end 104 is a distal end and the second end 114 is a proximal end relative to the supersonic nozzle 180. The gas recovery nozzle 100 further comprises a cavity 116 surrounding the passage 112. The cavity 116 is configured to collect at least some gas 160 expelled from the supersonic nozzle 180. In some implementations, an open end 140 of the cavity 116 at a part side 142 comprises curved walls 144 (e.g., arcuate shaped). In some other implementations, the open end 140 of the cavity 116 extends farther distally than the opening 108 at the first end 104 (and has a greater diameter than the first end 104 such that a space is defined between a gas flow path having the opening 108, and an inner surface of the main body 102). That is, the conical shaped first end 104 is positioned concentrically within the main body 102 and does not extend to the open end 140. The curved wall 144 is shaped and/or configured to facilitate capture of the expelled gas 160 after impinging on a part 152.

In some implementations, the gas 160 comprises an at least one of Helium or Nitrogen gas. In some implementations including the supersonic nozzle 180, Helium is the preferred gas 160. In the supersonic nozzle 180, the speed of the gas 160 correlates with the speed of sound and the Mach number of the gas 160. For Helium, the speed of sound at standard atmospheric conditions is 1007 m/s (1620 k/s). For Nitrogen, the speed of sound at standard atmospheric conditions is only 349 m/s (561 k/s). This translates into higher particle velocities when Helium is used versus when Nitrogen is used. Thus, if cost and availability are not deciding factors (that is, if the disclosure herein is implemented such that the gas 160 is reusable across cold spray sessions), then Helium provides superior performance in CSAM applications versus Nitrogen.

The cavity 116 defines a gas recovery path 162 that leads to an outlet 118. That is, the gas recovery nozzle 100 further comprises the outlet 118 within the main body 102 configured to connect to a gas recovery sub-system 190. In some implementations, the outlet 118 comprises an opening 120 configured to connect to a compressor pump 192 of the gas recovery sub-system 190. In some implementations including the compressor pump 192, a gas diffuser 196 is provided at the opening 120 of the cavity 116, which can be located inside, outside, or both inside and outside the cavity 116. The gas diffuser is constructed of an open pore metallic foam (e.g., ALUPOR™ cast aluminum metallic foam) or any mechanically equivalent material or component (e.g., a RADNOR® 14 Series gas diffuser). The gas diffuser 196 is configured to slow the flow of the gas 160 inside the cavity 116 to the opening 120. The gas diffuser 196 facilitates at least one of slowing the flow of gas 160 or directing the flow of gas 160 to the compressor pump 192.

Other implementations replace or complement the compressor pump 192 with another suitable type of pump, a turbofan, or any other mechanically suitable mechanism configured to pull the gas 160 into the gas recovery sub-system 190. In some other implementations, the outlet 118 comprises an opening 120 configured to connect to a moveable gas recovery tank 194. In some implementations, more than one moveable gas recovery tank 194 is connected to the opening 120. In implementations including the moveable gas recovery tank 194, the compressor pump 192, other suitable type of pump, the turbofan, vacuum, or any other mechanically suitable mechanism configured to both intake the gas 160 into the gas recovery sub-system 190 is further configured to ensure that the greatest possible volume of the gas 160 is compressed into and stored in the moveable gas recovery tank 194. Once the gas 160 is stored, the gas 160 is available for purification and reuse with suitable processes and apparatuses as described elsewhere herein (see, e.g., the discussion of FIG. 5). In some implementations, purification includes removal of Oxygen and other matter that is not the gas 160.

In some implementations, the main body 102 is tubular and configured to surround an end 182 of the supersonic nozzle 180. In some other implementations, the main body 102 is configured as a removable cover 130 to capture a flow of gas 160 from the supersonic nozzle 180 and circulate the gas 160 to the gas recovery sub-system 190. That is, the main body 102 is removably coupled to the supersonic nozzle 180, which may include mechanical attachment (e.g., bolt or screw attachment to a portion of the base of the supersonic nozzle 180) to secure the main body 102 thereto. That is, in some implementations, the gas recovery nozzle 100 is fixed proximate to the supersonic nozzle 180 by at least one screw or other mechanically suitable fastener.

Some implementations of the gas recovery nozzle 100 further comprise a flexible coupling 150 attached to the first end 104 and configured to engage the part 152. The part 152 is any item (e.g., portion of an aircraft or helicopter) requiring CSAM repair processes. In some implementations, the flexible coupling 150 is ring-shaped and positioned proximate to the substrate of the part 152 and forms at least a partial seal between the gas recovery nozzle 100 and the part 152. When forming at least a partial seal, the flexible coupling 150 comprises a gas capture cover 154. The flexible coupling 150 is constructed of at least one of an elastomer, flexible metallic material, or other mechanically suitable material that is sufficiently durable to provide an acceptable service lifetime before needing replacement, and also able to conform to the contours and dimensions of variously shaped parts 152. The flexible coupling 150, which is configured as a gas capture cover 154 in the illustrated implementation, addresses the standout distance effect, which has considerable performance implications for any implementation of CSAM in general and the gas recovery nozzle 100 in particular. If the standout distance between the gas recovery nozzle 100 and the part 152 is too small, the gas recovery nozzle 100 will be subject to clogging and other phenomenon having a deleterious performance impact and eventually requiring cleaning or even replacement. If the standout distance between the gas recovery nozzle 100 and the part 152 is too great, the performance of the gas recovery nozzle 100 degrades, leading to the escape of some or even all of the gas 160 otherwise subject to capture by the gas recovery nozzle 100. The flexible coupling 150 addresses the standout distance effect by (1) providing superior control of the exact standout distance during any CSAM repair session versus implementations not using the flexible coupling 150, and (2) in some implementations, directly contacting or almost contacting the substrate of the part 152 to further reduce the amount of used gas able to escape recapture. In some implementations, the flexible coupling 150 further comprises a spring or mechanical or electrical actuator to maintain such contact or partial contact. In some implementations, the flexible coupling 150 is a single component; in other implementations the flexible coupling 150 is a mechanism with more than one component. Multi-part flexible couplings 150 include but are not limited to flexible couplings 150 assembled using petal joins.

Modelling and experiments using implementations of the present disclosure indicate that negligible or zero gas recovery occurs when the standout distance is greater than or equal to one millimeter. Various such models and experiments using standout distances less than one millimeter demonstrate recovery of at least fifty percent to at least ninety percent of the gas 160 used in a particular CSAM session incorporating the gas recovery nozzle 100 fitted with the flexible coupling 150, depending on the standout distance. These models and experiments further indicate that implementations using a standout distance of 0.5 millimeters perform well, and the performance of implementations using 0.25 or less millimeters is optimal. FIG. 1 illustrates the gas recovery nozzle 100 comprising the flexible coupling 150 configured to mitigate the standout distance effect described above. By contrast, FIG. 5 as discussed elsewhere herein illustrates an implementation of a gas recovery nozzle not including the flexible coupling 150, demonstrating that implementations of the disclosure are still functional even when a flexible coupling or gas capture cover is not present to mitigate the standout distance effect.

Some implementations of the gas recovery nozzle 100 further comprise a heat transfer device 170 proximate to the supersonic nozzle 180 and the main body 102. The heat transfer device 170 is configured to regulate a temperature of the gas 160 such that the gas recovery nozzle 100 is protected from heat-induced damage from a flow of the gas 160. In some such implementations, the heat transfer device 170 further comprises a liquid cooling system. The heat transfer device 170 is any suitable device for transferring waste heat. Depending on the requirements of a particular application of an implementation of the gas recovery nozzle 100, the heat transfer device 170 is at least one of a heat pipe, heat sink, liquid cooling tube, or any other suitable heat transfer device or mechanism that is capable of transferring waste heat away from the gas 160 and or the gas recovery nozzle 100. The gas expansion will reduce the temperature of the gas proximate to the first end 104, cooling is more relevant close to the second end 114.

In some implementations, the heat transfer device 170 is an open system, such as a liquid cooling tube wherein the fluid flowing through the liquid cooling tube is in thermal communication with one or more additional heat transfer devices, such as a heat sink such that heat may be transferred from the heat transfer device 170 to the heat sink. For instance, the heat sink can be cooled with air, liquid, or a fan, or the heat sink can be a cold plate, or any other suitable heat sink. In some other implementations, waste heat carried by the heat transfer device 170 is dissipated into space using protrusions in thermal communication with the heat transfer device 170.

In some other implementations, the heat transfer device 170 is a closed system (e.g., a pulsating heat pipe ("PHP") or loop heat pipe ("LHP")). Each of the PHP and LHP are passive devices that operate under pressure differences caused by heat to force heated fluid to propagate toward a heat sink or other location where waste heat is withdrawn from the fluid. In yet other implementations, the heat transfer device 170 utilizes various configurations of heat pipes, such as straight, curved, crossing, or any number of configurations for achieving a desired amount of cooling. The heat transfer device 170 is configuration in various implementations to surround at least a portion of the main body 102 and be positioned between the main body 102 and the supersonic nozzle 180.

Figure 2:
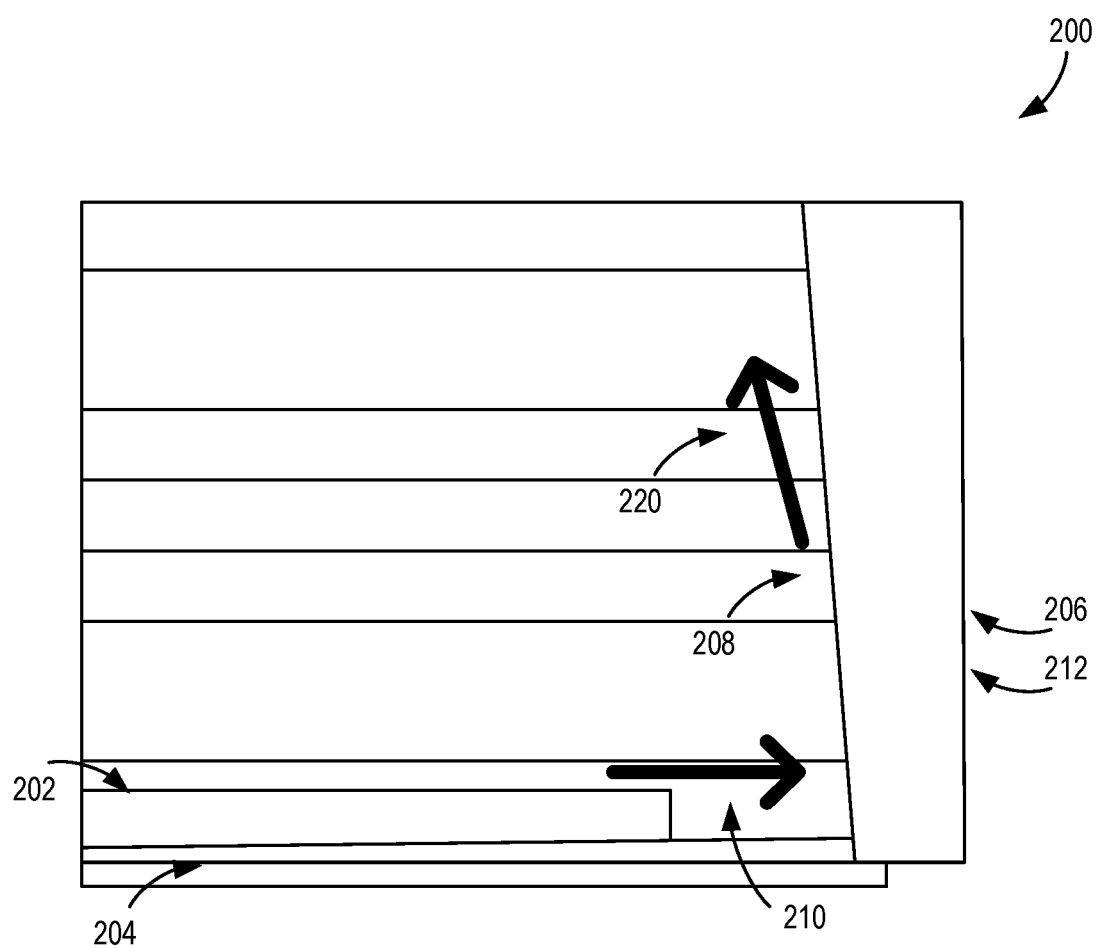
FIG. 2 is a side elevation illustration of a spray path of an implementation of a cold spray additive manufacturing and repair system in accordance with an implementation.

FIG. 2 is a side elevation illustration of a spray path of an implementation of a cold spray additive manufacturing system 200 in use in accordance with an implementation. The cold spray additive manufacturing system 200 does not show a gas recovery nozzle (e.g., the gas recovery nozzle 100 of FIG. 1), but instead illustrates how gas 208 (e.g., the gas 160 of FIG. 1) is lost when the gas recovery nozzle is not present. A nozzle 202 (e.g., the supersonic nozzle 180 of FIG. 1) propels additive particles 204 along the additive vector 210 to a substrate 206 through the nozzle 202 at a supersonic speed using the gas 208 to perform cold spray additive manufacturing of a part 212. While the additive particles 204 bond to the part 212 as described in FIG. 5 herein, the used gas escapes laterally along the substrate of the part 212, on the escape vector 220. Without use of the gas recovery nozzle as disclosed elsewhere herein, all of the gas 208 is lost along the escape vector 220 and cannot be reused. In some implementations, there are multiple escape vectors 220, each with a different direction. Gas traversing along any of the escape vectors 220 is permanently lost.

Figure 3:
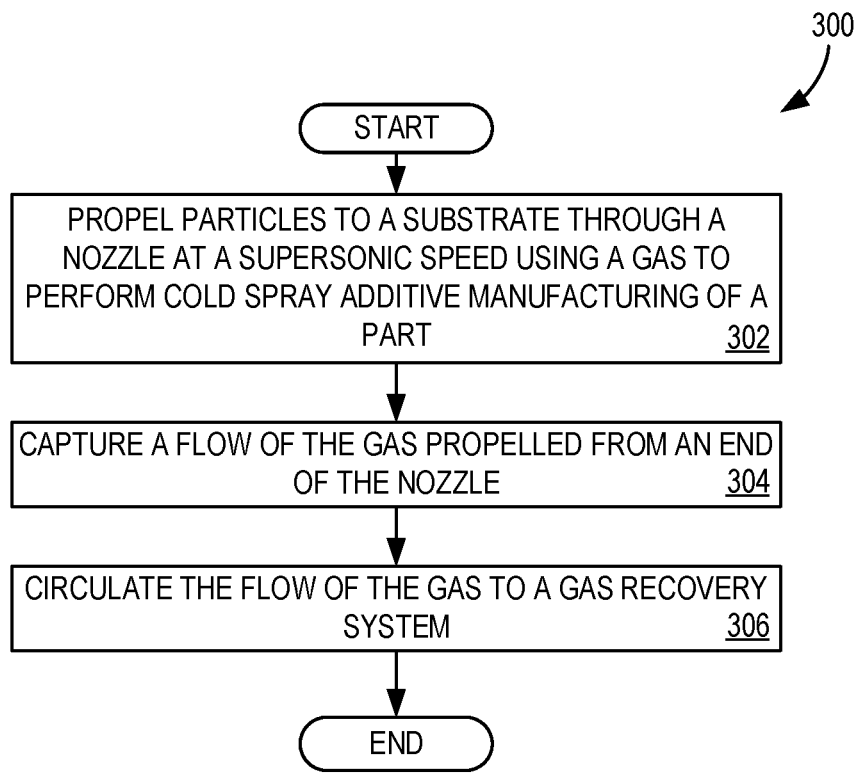
FIG. 3 is a flowchart illustrating a method for performing cold spray additive manufacturing of a part in accordance with an implementation.

FIG. 3 is a flowchart illustrating a method 300 for performing cold spray additive manufacturing of a part (e.g., the part 152) in accordance with an implementation. In some implementations, the process shown in FIG. 3 is performed by, at least in part, a gas recovery nozzle, a supersonic nozzle, a heat transfer device, and a gas recovery sub-system, such as the gas recovery nozzle 100, the supersonic nozzle 180, the heat transfer device 170, and the gas recovery sub-system 190 in FIG. 1. The method 300 propels particles to a substrate through a nozzle at a supersonic speed using a gas to perform cold spray additive manufacturing of a part at operation 302, captures a flow of the gas propelled from an end of the nozzle at operation 304, and circulates the flow of the gas to a gas recovery system at operation 306. The method 300 allows for in-situ cold spray additive manufacturing of a part. In some implementations, the substrate comprises at least one of the original substrate of a part or material (e.g., particles) applied previously to the original substrate (e.g., via a previous application of a CSAM method).

Thereafter, the process is complete. While the operations illustrated in FIG. 3 are performed by, at least in part, a gas recovery nozzle, a supersonic nozzle, a heat transfer device, and a gas recovery sub-system, aspects of the disclosure contemplate performance of the operations by other entities. In some implementations, a cloud service performs one or more of the operations (e.g., by controlling the nozzle to cause particles to be propelled to a substrate through a nozzle at a supersonic speed using a gas to perform cold spray additive manufacturing of a part). In some implementations of the method 300, the propelling of particles comprises structurally repairing the part in situ as further described elsewhere in this disclosure. In some other implementations, the gas comprises an at least one of a high-pressure Helium or Nitrogen gas. In yet other implementations, the gas comprises an at least one of a low-pressure Helium or Nitrogen gas.

Figure 4:
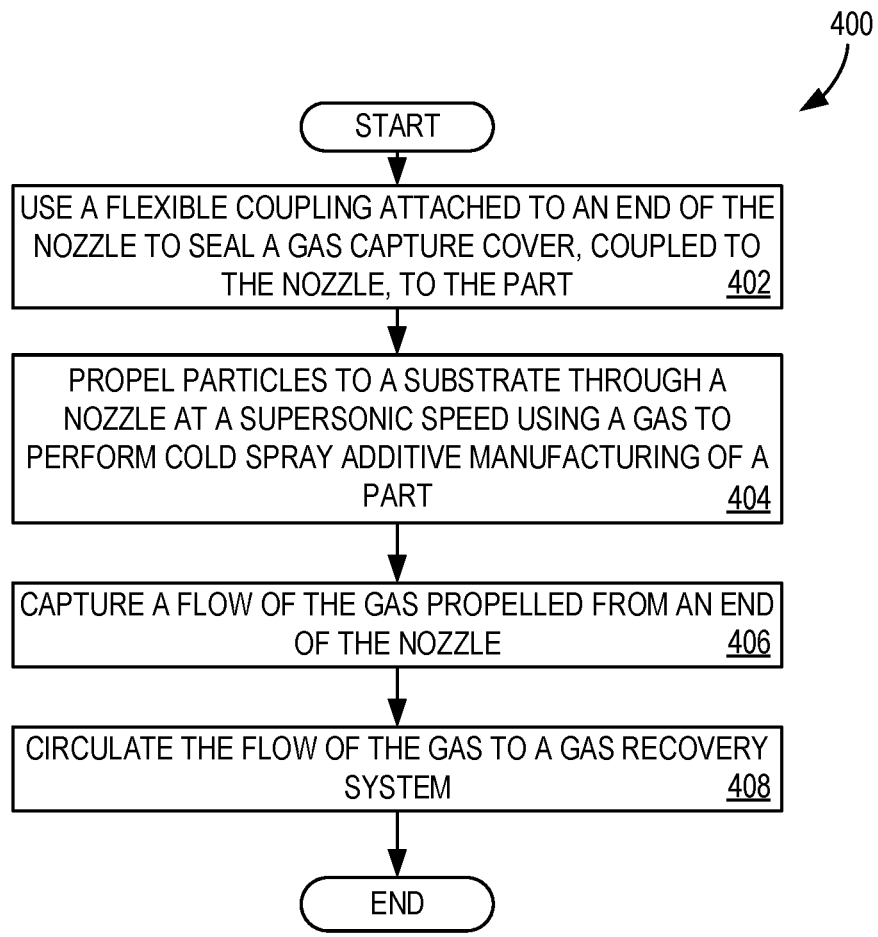
FIG. 4 is a flowchart illustrating another method for performing cold spray additive manufacturing of a part in accordance with an implementation.

FIG. 4 is a flow chart illustrating another method 400 for performing cold spray additive manufacturing of a part (e.g., the part 152) in accordance with an implementation. In some implementations, the method shown in FIG. 4 is performed by, at least in part, a gas recovery nozzle, a supersonic nozzle, a heat transfer device, a gas recovery sub-system, a flexible coupling, and a gas capture cover, such as the gas recovery nozzle 100, the supersonic nozzle 180, the heat transfer device 170, the gas recovery sub-system 190, the flexible coupling 150, and the gas capture cover 154 in FIG. 1. The method 400 uses a flexible coupling attached to an end of the nozzle to seal a gas capture cover, coupled to the nozzle, to the part at operation 402. Operations 404, 406, and 408 are similar to operations 302, 304, and 306 of the method 300 depicted in FIG. 3, and accordingly the description will not be repeated. The method 400 accommodates for variations in standout distances as described in more detail herein.

Thereafter, the process is complete. While the operations illustrated in FIG. 4 are performed by performed by, at least in part, a gas recovery nozzle, a supersonic nozzle, a heat transfer device, a gas recovery sub-system, a flexible coupling, and a gas capture cover, aspects of the disclosure contemplate performance of the operations by other entities. In some implementations, a cloud service performs one or more of the operations (e.g., by controlling the nozzle to cause particles to be propelled to a substrate through a nozzle at a supersonic speed using a gas to perform cold spray additive manufacturing of a part).

Figure 5:
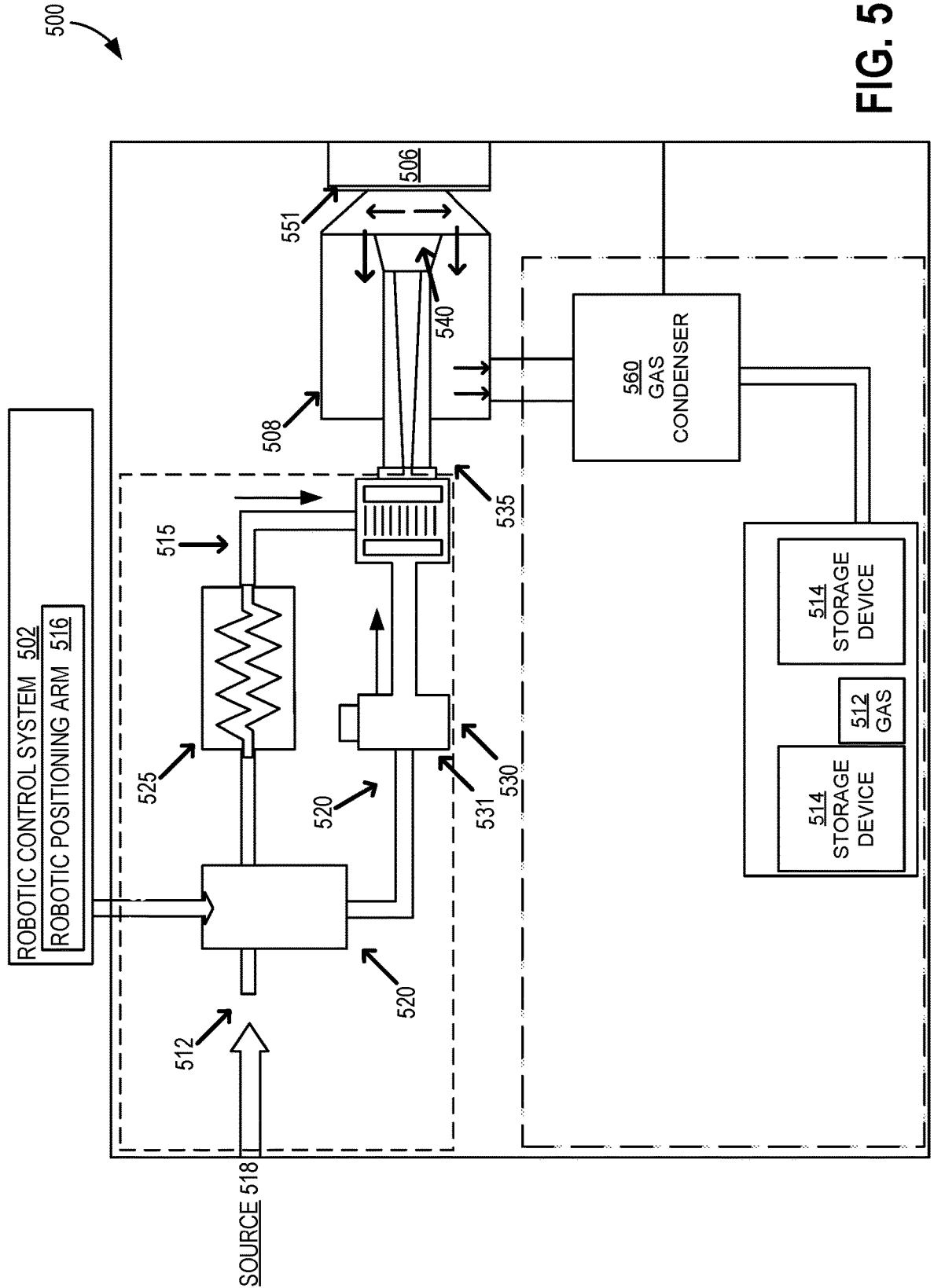
FIG. 5 is a block diagram illustrating an operating environment showing an implementation of a system for performing cold spray additive manufacturing with gas recovery in accordance with an implementation.

An operating environment is illustrated in FIG. 5 showing a block diagram of an implementation of a system 500 for performing cold spray additive manufacturing with gas recovery in accordance with an implementation. The system 500 comprises a robotic control system 502 configured to control a cold spray apparatus 504. In some implementations, the robotic control system further comprises a robotic positioning arm 516 (e.g., robotically controlled mechanical arm). In some implementations, the robotic control system 502 is a manual or at least partially automated apparatus. In some such implementations, the robotic control system is controllable using a computing device, such as the computing device 800 of FIG. 8 herein. In some implementations, the robotic positioning arm 516 is at least a five-axis positioning system that includes two axes for positioning in a plane of the part under repair, one axis for the standout distance, and two additional axes for additional requisite positioning. Alternatively, the robotic positioning arm 516 is at least a two axis positioning system for XY positioning in the plane of part under repair and a rolling system that maintains parallelism and standout distance with the substrate of the part under repair. The robotic positioning arm 516, in some implementations, is an ADEPT® Viper robot from Omron Adept Technologies, Inc.

The cold spray apparatus 504 of the system 500 further comprises a supersonic nozzle 535 (e.g., implemented as the supersonic nozzle 180 of FIG. 1) and is configured to perform cold spray additive manufacturing of a part 506 (e.g., the part 152 of FIG. 1). In some implementations, the cold spray apparatus 504 is further configured to cold spray a powder 530 onto a substrate 551 of the part 506. In such implementations, the cold spray apparatus 504 further comprises a source 518 of gas 512 connected to a gas control module 520. The gas control module 520 controls the flow of the gas 512 through a first line 515 connected to the supersonic nozzle 535 and through a second line 520 connected to a powder chamber 531 and then to the supersonic nozzle 535. The cold spray apparatus 504 additionally comprises a heater 525 that heats the gas 512 to a requisite temperature prior to entrance of the gas 512 into the supersonic nozzle 535. In some implementations, the substrate 551 is also heated to further facilitate mechanical bonding.

In operation, the gas 512 flows through the first line 515 and the second line 520 causing the powder 530 located within the powder chamber 531 to be sprayed in a supersonic gas jet from the supersonic nozzle 535 as a particle stream 540. The particle stream 540 is sprayed at a temperature below the melting point of the powder 530 and travels at a supersonic velocity from the supersonic nozzle 535. In some implementations, the particle stream 540 travels at several times the speed of sound. (The exact speed of sound at a given time varies depending on local conditions). In some implementations, the particle stream 540 travels at least two- to four-times the speed of sound. The particle stream is deposited on the substrate 551 of the part 506, whereby on impact on the substrate 551, particles of the particle stream 540 undergo plastic deformation due to the supersonic velocity of the particle stream 540 and bond to each other and the substrate 551 of the part 506 using mechanical energy. The heater 525 accelerates the speed of the particle stream 540, but the heat from the heated gas 512 is not transferred to the bonding of the particles of the particle stream 540. Thus, the heat cannot cause deformities, warping, stresses, or other deleterious impacts to the bonding. In some implementations, once the cold spray process is complete the substrate 551 is further processes, such as polished to create or restore a smooth finish.

The system 500 further comprises a gas recovery nozzle 508 (e.g., implemented as the gas recovery nozzle 100 of FIG. 1). The gas recovery nozzle 508 comprises a main body (e.g., implemented as the main body 102 of FIG. 1) configured to attach to the supersonic nozzle; a first end (e.g., implemented as the first end 104 of FIG. 1) having angled walls (e.g., implemented as the angled walls 106 of FIG. 1) at an opening (e.g., implemented as the opening 108 of FIG. 1) defining a gas flow path (e.g., implemented as the gas flow path 110 of FIG. 1) from the supersonic nozzle and a passage (e.g., implemented as the passage 112 of FIG. 1) extending from the first end to a second end (e.g., implemented as the second end 114 of FIG. 1), the first end being a distal end and the second end being a proximal end relative to the supersonic nozzle.

The gas recovery nozzle 508 further comprises a cavity (e.g., implemented as the cavity 116 of FIG. 1) surrounding the passage and configured to collect at least some gas 512 (e.g., such as the gas 160 of FIG. 1) expelled from the supersonic nozzle and defining a gas recovery path (e.g., implemented as the gas recovery path 162 of FIG. 1), and an outlet (e.g., implemented as the outlet 118 of FIG. 1) within the main body configured to connect to a gas recovery sub-system 510 (e.g., implemented the gas recovery sub-system 190 of FIG. 1). The gas recovery sub-system 510 is configured to connect to the outlet and also configured to collect at least some gas 512 expelled from the supersonic nozzle 535 through the gas recovery path into a storage device 514 (e.g., implemented as the moveable gas recovery tank 194 of FIG. 1). The gas 512 is thereby collected into the storage device 514 and is stored for treatment and reuse in the cold spray apparatus 504.

In some implementations, the gas recovery sub-system 510 further comprises a gas condenser 560 configured to condense at least some gas 512 in the storage device 514, such that storage device 514 stores the greatest possible volume of at least some gas 512. In some implementations, the gas condenser 560 is the compressor pump 192 of FIG. 1 or an equivalent device. The storage device 514 is configured to be transportable to a purifier configured to remove all contaminants from at least some gas 512 such that at least some gas 512 is suitable for re-use in the cold spray apparatus 504.

ADDITIONAL EXAMPLES

In general, there are two types of cold spray repair techniques. Non-Structural Cold Spray is concerned with adding thickness to a part. This technology has been developed and matured to the point that the United States Department of Defense has installed Non-Structural Cold Spray repair systems at many depots. Non-structural cold spray does not require the use of Helium carrier gas, due to less demanding mechanical requirements. Various implementations of the disclosure herein are targeted to Structural Cold Spray, which is concerned not merely with adding thickness to existing parts but reconditioning and repair of damaged, worn, or otherwise out of spec parts. Among other applications, Structural Cold Spray is suitable to repair corrosion, repair cracks, or restore tolerances/exact dimensions. Additionally, some implementations of Structural Cold Spray do not require stripping and reapply the finish of the part subject to repair. As disclosed herein, CSAM mechanically bonds particles to a substrate using purely mechanical energy, with no need for added adhesives.

The implementations herein provide apparatuses, methods, and systems for using cold spray technology to conduct structural repairs in situ by capturing the flow of gas from the supersonic nozzle during a cold spray process and circulating the gas to a gas recovery sub-system for later reuse in additional cold spray processes. Some implementations of the gas recovery nozzle incorporate a cover (e.g., a flexible coupling) to capture the flow of gas and circulate the gas to the gas recovery sub-system. The disclosure herein operates at the point of repair to capture spent gas proximate to a supersonic nozzle via a gas recovery nozzle and store the gas for later purification and reuse.

Unless otherwise stated, any implementation described herein as being incorporated into or being used in combination with a specific type of vehicle (e.g., an aircraft or helicopter) shall be understood to be installable into and usable with any other type of vehicle (e.g., trains, submersibles, tanks, armored personnel carriers, watercraft, etc.). Implementations of the disclosure herein are well-suited to repairing aircraft in-situ as described elsewhere herein, allowing the service life of such aircraft to be maximally extended at lesser cost. Cold spray is recognized by various organizations as a solution distinct from and advantageous over thermal spray.

In particular, as aircraft enter the extreme ends of repeatedly extended service lifetimes, inevitably fleet fatigue causes cracks and other damage requiring structural repairs, part replacement, and part repair to keep the aircraft in service. This escalates the cost of keeping such aircraft flying due to requiring recurrent inspections to maintain air worthiness, eventual retrofits, and long lead times and high expenses associated with supply chain issues. Cold spray is especially well suited to perform these types of repairs in situ to rehabilitate existing parts of such aircraft (e.g., repairs performed on aircraft components in an aircraft hangar without disassembly), potentially significantly reducing maintenance costs and also lowing downtime for military aircraft platforms. In 2008 (with revisions following in 2011 and 2015), the United States Department of Defense adopted and promulgated MIL Spec MIL-STD-3021 ("DOD Manufacturing Process Standard, Materials Deposition, Cold Spray"). The MIL-STD-3021 standard has been adopted by various other organizations around the world.

The disclosure herein is usable in a number of present military and commercial cold spray applications. Such applications include but are not limited to:

- Use by the United States Army through Maintenance Engineering Order T-7631 by the Program Office UH-60 Blackhawk for the repair of magnesium aerospace components;
- Use in maintenance and repair of landing gear hydraulics for the B1 Rockwell B-1 Lancer supersonic heavy bomber;
- Research by the U.S. Army Research Laboratory in collaboration with private industry for applications for additive manufacturing as diverse as near-net forming of shape charge liners, donor tubes for explosive cladding and sputter targets;
- Automotive repairs;
- Magnesium aerospace component repairs; and
- A growing number of worldwide RDT and E programs other qualified aerospace repair procedures worldwide.

At the time of this disclosure, in cold spray applications using Helium without any means to recover and reuse the gas, the cost of each cold spray additive manufacturing repair session can include at least $1,000-$2,000 per hour in unrecoverable, single-use Helium expenditures. In many instances, this comprises the majority of the expense for such cold spray additive manufacturing repair sessions. Such sessions take more time and cost more money the more complex the part is that is under repair. Without a means to reuse the Helium, the commercial economic viability of CSAM repair is severely curtailed.

Various implementations herein use a gas recovery sub-system (e.g., the gas recovery sub-system 190 of FIG. 1 or 510 of FIG. 5) to gather and store used gas for later purification and reuse in future cold spray additive manufacturing processes. The disclosure is usable with a number of commercially available purification/purifier systems, including those both presently available and not yet released. In some implementations, the disclosure is usable with QUANTUMPURE CS™ and QuantumPure CS-TRI GAS™ Helium recovery and purification systems by Quantum Technology Corporation.

At least a portion of the functionality of the various elements in the figures are in some implementations performed by other elements in the figures, and or an entity (e.g., a computer) not shown in the figures.

In some implementations, the operations illustrated in FIG. 3 and FIG. 4 are performed by a single person, a group of persons, a fully- or partially-automated cold spray additive manufacturing with gas recovery system, or any combination of the foregoing. As an illustration, in some implementations the gas recovery nozzle, supersonic nozzle, heat transfer device, and gas recovery sub-system are each be provided by distinct suppliers to a wholly separate assembler who couples the gas recovery nozzle to the supersonic nozzle.

While the aspects of the disclosure have been described in terms of various implementations with their associated operations, a person skilled in the art would appreciate that a combination of operations from any number of different implementations is also within scope of the aspects of the disclosure.

Exemplary Operating Environment

Figure 6:
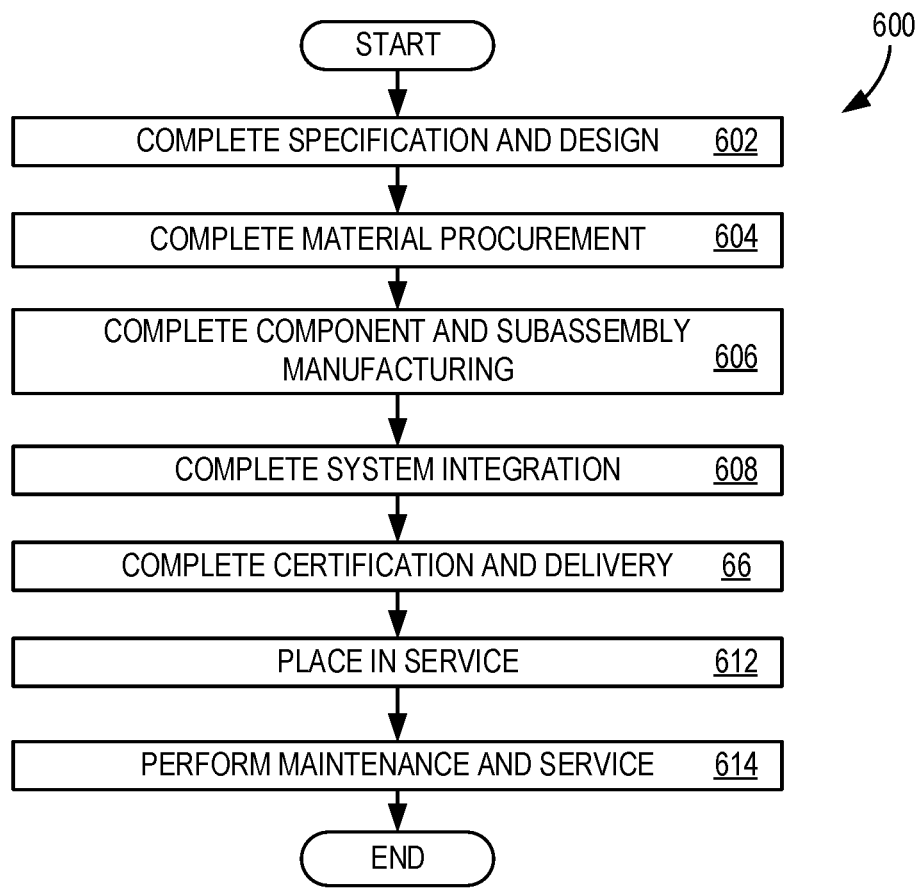
FIG. 6 is a flow chart illustrating a method for aircraft manufacturing and service in accordance with an implementation.

The present disclosure is operable within an aircraft manufacturing and service method according to an implementation as a method 600 in FIG. 6. During pre-production of the aircraft, some implementations of method 600 include specification and design of the aircraft at operation 602, and material procurement at operation 604. During production, some implementations of method 600 include component and subassembly manufacturing at operation 606 and aircraft system integration at operation 608. The aircraft undergoes certification and delivery at operation 610 in order to be placed in service at operation 612. While in service of a customer, the aircraft is scheduled for routine maintenance and service at operation 614. In some implementations, operation 614 comprises modification, reconfiguration, refurbishment, and other operations associated with maintaining the aircraft in acceptable, safe condition during ongoing flight operations. Systems and methods for cold spray additive manufacturing as disclosed herein are used during operation 614.

Each of the processes of method 600 are performable or practicable by a system integrator, a third party, or an operator (e.g., a customer). For the purposes of this disclosure, a system integrator comprises any number of aircraft manufacturers and major-system subcontractors; a third party comprises any number of vendors, subcontractors, and suppliers; and an operator comprises an airline, leasing company, military entity, service organization, and similar entities providing similar sales and leasing services.

Figure 7:
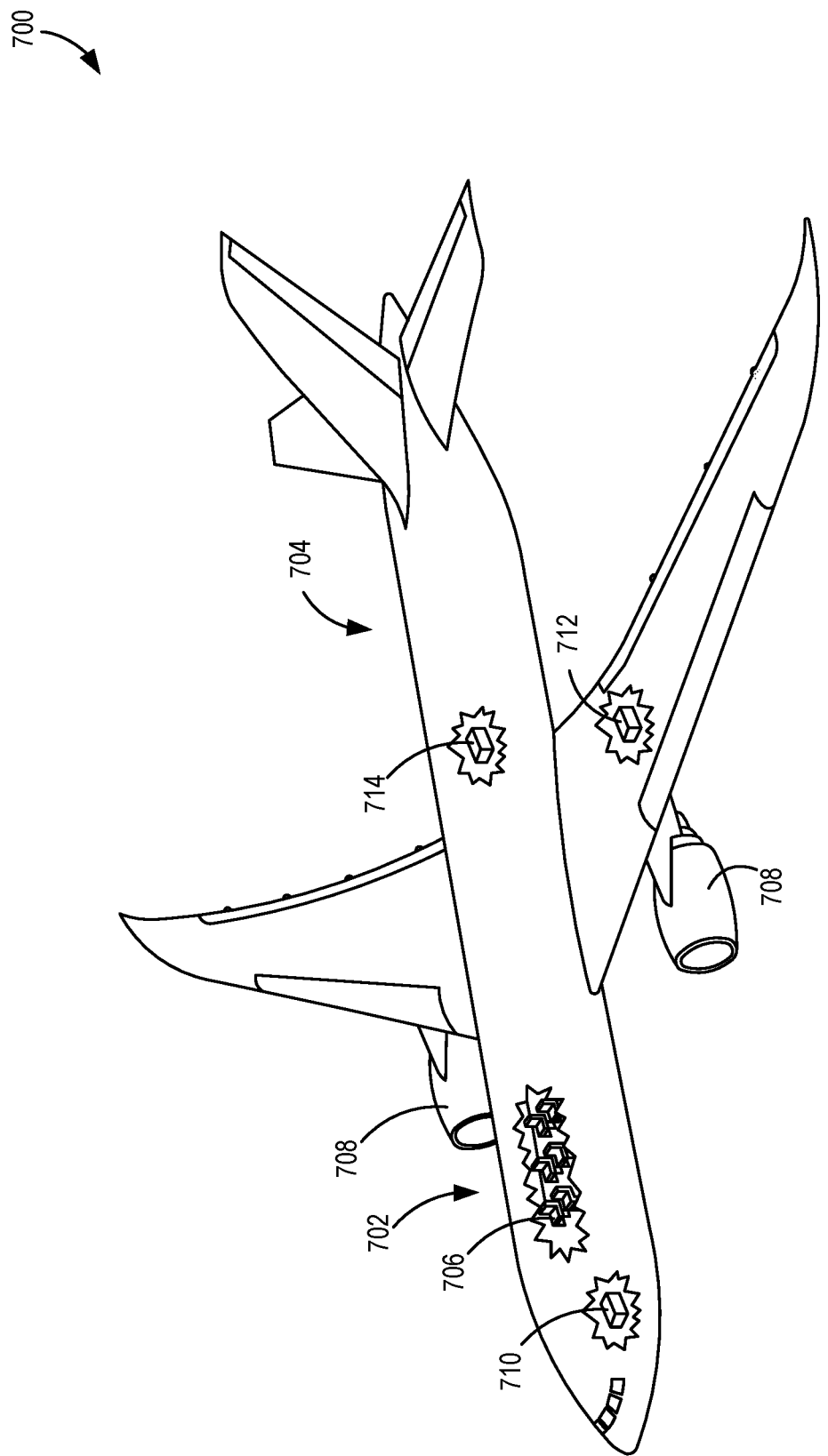
FIG. 7 is a schematic perspective view of an aircraft in accordance with an implementation.

The present disclosure is operable in a variety of terrestrial and extra-terrestrial environments for a variety of applications. For illustrative purposes only, and with no intent to limit the possible operating environments in which implementations of the disclosure operate, the following exemplary operating environment is presented. The present disclosure is operable within an aircraft operating environment according to an implementation as an aircraft 700 in FIG. 7. Implementations of the aircraft 700 include but are not limited to an airframe 702, a plurality of high-level systems 704, and an interior 706. Some implementations of the aircraft 700 incorporate high-level systems 704 including but not limited to: one or more of a propulsion system 708, an electrical system 710, a hydraulic system 712, and an environmental system 714. Any number of other systems may be included in implementations of the aircraft 700. Although an aerospace implementation is shown, the principles are applicable to other industries, such as the automotive and nautical industries.

Figure 8:
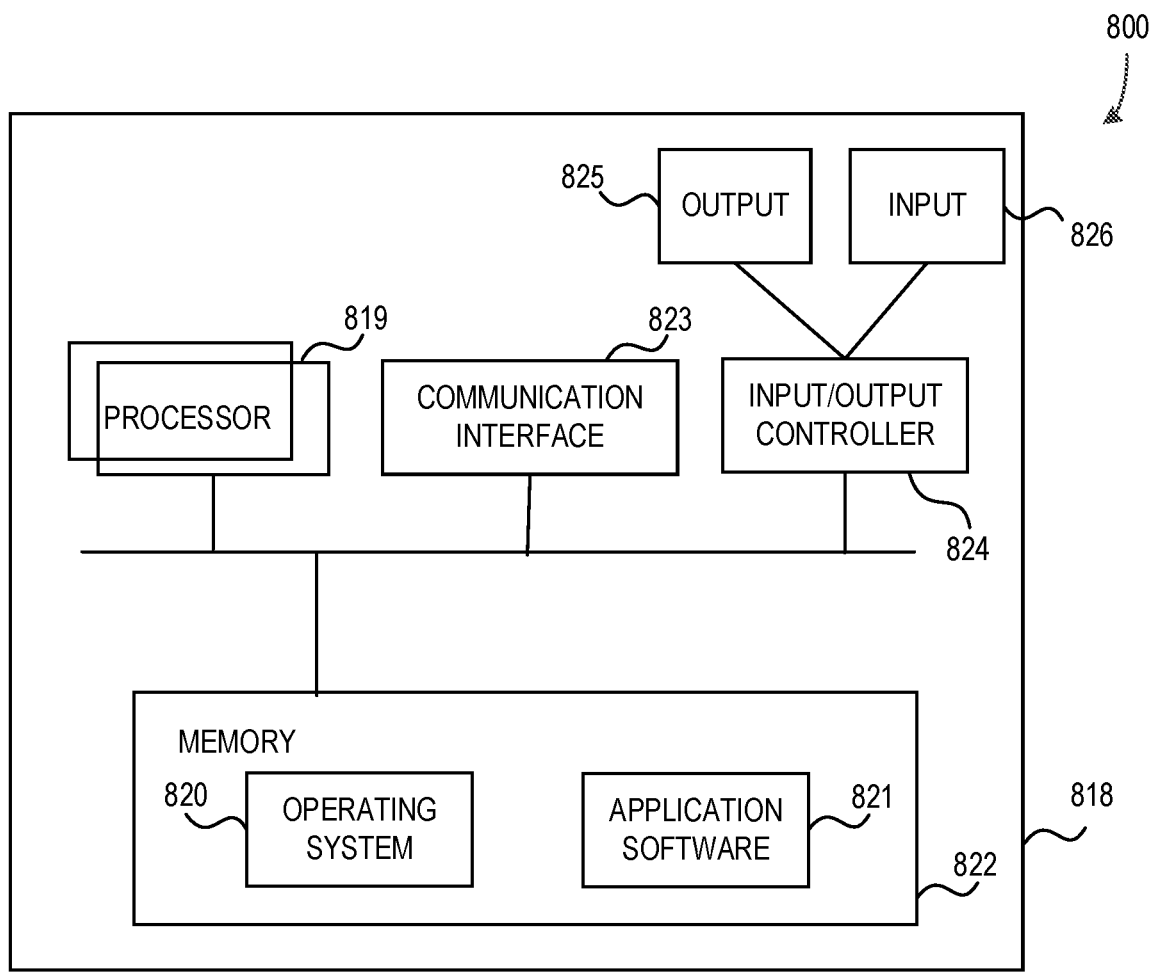
FIG. 8 is a functional block diagram illustrating a computing apparatus in accordance with an implementation.

The present disclosure is operable with a computing apparatus according to an implementation as a functional block diagram 800 in FIG. 8. In such an implementation, components of a computing apparatus 818 may be implemented as a part of an electronic device according to one or more implementations described in this specification. The computing apparatus 818 comprises one or more processors 819 which may be microprocessors, controllers or any other suitable type of processors for processing computer executable instructions to control the operation of the electronic device. Platform software comprising an operating system 820 or any other suitable platform software may be provided on the apparatus 818 to enable application software 821 to be executed on the device. According to an implementation, the cold spray additive manufacturing system as described herein may be implemented at least partially by software.

Computer executable instructions may be provided using any computer-readable media that are accessible by the computing apparatus 818. Computer-readable media may include, without limitation, computer storage media such as a memory 822 and communications media. Computer storage media, such as a memory 822, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that is usable to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, in some implementations a display or a speaker, which may be separate from or integral to the electronic device. The input/output controller 824 may also be configured to receive and process an input from one or more input devices 826, in some implementations a keyboard, a microphone or a touchpad. In one implementation, the output device 825 may also act as the input device. A touch sensitive display is one such device. The input/output controller 824 may also output data to devices other than the output device, e.g., a locally connected printing device. In some implementations, a user may provide input to the input device(s) 826 and/or receive output from the output device(s) 825.

The functionality described herein is performable, at least in part, by one or more hardware logic components. According to an implementation, the computing apparatus 818 is configured by the program code when executed by the processor 819 to execute the implementations of the operations and functionality described. Alternatively, or in addition, the functionality described herein is performable, at least in part, by one or more hardware logic components. Without limitation, illustrative types of hardware logic components that are usable include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Thus, various implementations include systems and methods for performing cold spray additive manufacturing with gas recovery comprising propelling particles to a substrate through a nozzle at a supersonic speed using a gas to perform cold spray additive manufacturing of a part; capturing a flow of the gas propelled from an end of the nozzle; and circulating the flow of the gas to a gas recovery system.

As described herein, the present disclosure provides systems and methods for cold spray additive manufacturing with gas recovery. The systems and methods herein efficiently and effectively construct and deploy within cold spray additive manufacturing with gas recovery system suitable for use in connection with repairs in situ of a number of moving vehicles, including but not limited to the above exemplary operating environment.

While various spatial and directional terms, such as top, bottom, lower, mid, lateral, horizontal, vertical, front and the like may be used to describe the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein is extendable or alterable without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above can relate to one implementation or can relate to several implementations. The implementations are not limited to those that address every issue discussed in the Background herein or those that have any or all of the stated benefits and advantages.

The implementations illustrated and described herein as well as implementations not specifically described herein but within the scope of aspects of the claims constitute exemplary means for cold spray additive manufacturing with gas recovery.

The order of execution or performance of the operations in implementations of the disclosure illustrated and described herein is not essential, unless otherwise specified. That is, the operations may be performed in any order, unless otherwise specified, and examples of the disclosure may include additional or fewer operations than those disclosed herein. As an illustration, it is contemplated that executing or performing a particular operation before, contemporaneously with, or after another operation is within the scope of aspects of the disclosure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

CLAUSES

The following clauses describe further aspects:
Clause Set A:
A1. A gas recovery nozzle comprising:
a main body configured to attach to a supersonic nozzle;
a first end having angled walls at an opening defining a gas flow path from the supersonic nozzle;
a passage extending from the first end to a second end, the first end being a distal end and the second end being a proximal end relative to the supersonic nozzle;
a cavity surrounding the passage and configured to collect at least some gas expelled from the supersonic nozzle and defining a gas recovery path;
an outlet within the main body configured to connect to a gas recovery sub-system.

A2. The gas recovery nozzle of any preceding clause, wherein the outlet comprises an opening configured to connect to a compressor pump of the gas recovery sub-system; and wherein the cavity further comprises a gas diffuser;
the gas diffuser configured to slow the flow of the at least some gas inside the cavity to the opening;
whereby the gas diffuser facilitates at least one of slowing the flow of the at least some gas or directing the flow of the at least some gas to the compressor pump.

A3. The gas recovery nozzle of any preceding clause, wherein the outlet comprises an opening configured to connect to a movable gas recovery tank.

A4. The gas recovery nozzle of any preceding clause, wherein the gas comprises an at least one of Helium or Nitrogen gas.

A5. The gas recovery nozzle of any preceding clause, wherein the main body is tubular and configured to surround an end of the supersonic nozzle.

A6. The gas recovery nozzle of any preceding clause, wherein the main body is configured as a removable cover to capture a flow of gas from the supersonic nozzle and circulate the gas to the gas recovery sub-system.

A7. The gas recovery nozzle of any preceding clause, wherein the main body is configured as a removable cover to suppress noise during a cold spray process wherein gas is expelled from the supersonic nozzle.

A8. The gas recovery nozzle of any preceding clause, wherein an open end of the cavity at a part side comprises curved walls.

A9. The gas recovery nozzle of any preceding clause, wherein the open end of the cavity extends farther distally than the opening at the first end.

A10. The gas recovery nozzle of any preceding clause, further comprising a flexible coupling attached to the first end and configured to engage a part.

Clause Set B:

B1. A method for performing cold spray additive manufacturing, the method comprising:
- propelling particles to a substrate through a nozzle at a supersonic speed using a gas to perform cold spray additive manufacturing of a part;
- capturing a flow of the gas propelled from an end of the nozzle; and
- circulating the flow of the gas to a gas recovery system.

B2. The method of any preceding clause, wherein the propelling of particles comprises structurally repairing the part in situ.

B3. The method of any preceding clause, wherein the gas comprises an at least one a of a high-pressure Helium or Nitrogen gas.

Clause Set C:

C1. A system for performing cold spray additive manufacturing with gas recovery (500), comprising:
- a robotic control system configured to control a cold spray apparatus;
- the cold spray apparatus having a supersonic nozzle, the cold spray apparatus configured to perform cold spray additive manufacturing of a part;
- a gas recovery nozzle comprising:
  - a main body configured to attach to the supersonic nozzle;
  - a first end having angled walls at an opening defining a gas flow path from the supersonic nozzle;
  - a passage extending from the first end to a second end, the first end being a distal end and the second end being a proximal end relative to the supersonic nozzle;
  - a cavity surrounding the passage and configured to collect at least some gas expelled from the supersonic nozzle and defining a gas recovery path;
  - an outlet within the main body configured to connect to a gas recovery sub-system; and
- the gas recovery sub-system configured to connect to the outlet and also configured to collect at least some gas expelled from the supersonic nozzle through the gas recovery path into a storage device;
- whereby at least some gas collected into the storage device is stored for treatment and reuse in the cold spray apparatus.

C2. The system of any preceding clause, wherein the robotic control system further comprises a robotic positioning arm.

C3. The system of any preceding clause, wherein the cold spray apparatus is further configured to cold spray a powder onto a substrate of a part, the cold spray apparatus further comprising:
- a source of gas connected to a gas control module, the gas control module controlling the flow of the gas through a first line connected to the supersonic nozzle and through a second line connected to a powder chamber and then to the supersonic nozzle;
- a heater that heats the gas to a requisite temperature prior to entrance of the gas into the supersonic nozzle;
- the gas flowing through the first line and the second line causing the powder located within the powder chamber to be sprayed in a supersonic gas jet from the supersonic nozzle as a particle stream, the particle stream being sprayed at a temperature below the melting point of the powder;
- the particle stream travelling at a supersonic velocity from the supersonic nozzle and being deposited on the substrate of the part;
- whereby on impact on the substrate, particles of the particle stream undergo plastic deformation due to the supersonic velocity of the particle stream and bond to each other; and
- whereby the heater accelerates the speed of the particle stream, but the heat from the heated gas is not transferred to the bonding of the particles of the particle stream.

C4. The system of any preceding clause, wherein the gas recovery sub-system further comprises:
- a gas condenser configured to condense the at least some gas in the storage device, such that storage device stores the greatest possible volume of at least some gas;
- the storage device configured to be transportable to a purifier;
- the purifier being configured to remove all contaminants from the at least some gas such that the at least some gas is suitable for re-use in the cold spray apparatus.

What is claimed is:

1. A gas recovery nozzle comprising:
- a main body configured to attach to a supersonic nozzle and a first pressure supply;
- a first end having an angled wall that expands outwardly from an opening defining a gas flow path from the supersonic nozzle;
- a passage extending from the first end to a second end, the first end being a distal end and the second end being a proximal end relative to the supersonic nozzle;
- a cavity surrounding the passage and configured to collect at least some gas expelled from the supersonic nozzle and defining a gas recovery path, wherein an open end of the cavity is located at a part side of the main body and comprises a curved wall that tapers adjacent the part side and expands adjacent an interior of the cavity; and
- an outlet within the cavity configured to connect to a gas recovery sub-system, and a second pressure supply of the gas recovery sub-system.

2. The gas recovery nozzle of claim 1, wherein the second pressure supply is a compressor pump of the gas recovery sub-system; and
- wherein the cavity further comprises a gas diffuser;
- the gas diffuser is configured to slow the flow of the at least some gas inside the cavity to the opening;

whereby the gas diffuser facilitates at least one of slowing the flow of the at least some gas or directing the flow of the at least some gas to the compressor pump.

3. The gas recovery nozzle of claim 1, wherein the outlet comprises an opening configured to connect to a movable gas recovery tank.

4. The gas recovery nozzle of claim 1, wherein the gas comprises an at least one of Helium or Nitrogen gas.

5. The gas recovery nozzle of claim 1, wherein the main body is tubular and configured to surround an end of the supersonic nozzle.

6. The gas recovery nozzle of claim 1, wherein the main body is configured as a removable cover to capture a flow of gas from the supersonic nozzle and circulate the gas to the gas recovery sub-system.

7. The gas recovery nozzle of claim 1, wherein the main body is configured as a removable cover to suppress noise during a cold spray process wherein gas is expelled from the supersonic nozzle.

8. The gas recovery nozzle of claim 1, wherein the open end of the cavity extends farther distally than the opening at the first end.

9. The gas recovery nozzle of claim 1, further comprising a flexible coupling attached to the first end and configured to engage a part.

10. The gas recovery nozzle of claim 1, further comprising a heat transfer device proximate to the supersonic nozzle and the main body, the heat transfer device configured to regulate a temperature of the gas such that the recovery nozzle is protected from heat-induced damage from a flow of the gas.

11. The gas recovery nozzle of claim 10, wherein the heat transfer device further comprises a liquid cooling system.

12. A system for performing cold spray additive manufacturing with gas recovery, comprising:
a robotic control system configured to control a cold spray apparatus;
the cold spray apparatus having a supersonic nozzle, the cold spray apparatus configured to perform cold spray additive manufacturing of a part;
a gas recovery nozzle comprising:
a main body configured to attach to the supersonic nozzle and a first pressure supply;
a first end having an angled wall that expands outwardly from an opening defining a gas flow path from the supersonic nozzle;
a passage extending from the first end to a second end, the first end being a distal end and the second end being a proximal end relative to the supersonic nozzle;
a cavity surrounding the passage and configured to collect at least some gas expelled from the supersonic nozzle and defining a gas recovery path, wherein an open end of the cavity is located at a part side of the main body and comprises a curved wall that tapers adjacent the part side and expands adjacent an interior of the cavity;
an outlet within the cavity configured to connect to a gas recovery sub-system, and a second pressure supply of the gas recovery sub-system; and
the gas recovery sub-system configured to connect to the outlet and also configured to collect the at least some gas expelled from the supersonic nozzle through the gas recovery path into a storage device;
whereby the at least some gas collected into the storage device is stored for treatment and reuse in the cold spray apparatus.

13. The system of claim 12, wherein the robotic control system further comprises a robotic positioning arm.

14. The system of claim 12, wherein the cold spray apparatus is further configured to cold spray a powder onto a substrate of a part, the cold spray apparatus further comprising:
a source of gas connected to a gas control module, the gas control module controlling the flow of the gas through a first line connected to the supersonic nozzle and through a second line connected to a powder chamber and then to the supersonic nozzle;
a heater that heats the gas to a requisite temperature prior to entrance of the gas into the supersonic nozzle;
the gas flowing through the first line and the second line causing the powder located within the powder chamber to be sprayed in a supersonic gas jet from the supersonic nozzle as a particle stream, the particle stream being sprayed at a temperature below the melting point of the powder;
the particle stream travelling at a supersonic velocity from the supersonic nozzle and being deposited on the substrate of the part;
whereby on impact on the substrate, particles of the particle stream undergo plastic deformation due to the supersonic velocity of the particle stream and bond to each other; and
whereby the heater accelerates the speed of the particle stream, but the heat from the heated gas is not transferred to the bonding of the particles of the particle stream.

15. The system of claim 12, wherein the gas recovery sub-system further comprises: a gas condenser configured to condense the at least some gas in the storage device, such that storage device stores the greatest possible volume of the at least some gas; the storage device configured to be transportable to a purifier; the purifier being configured to remove all contaminants from the at least some gas such that the at least some gas is suitable for re-use in the cold spray apparatus.

* * * * *